Aug. 20, 1929.   D. A. McCONNELL   1,725,405
WINDSHIELD WIPER AND THE LIKE
Original Filed March 26, 1924   2 Sheets-Sheet 1
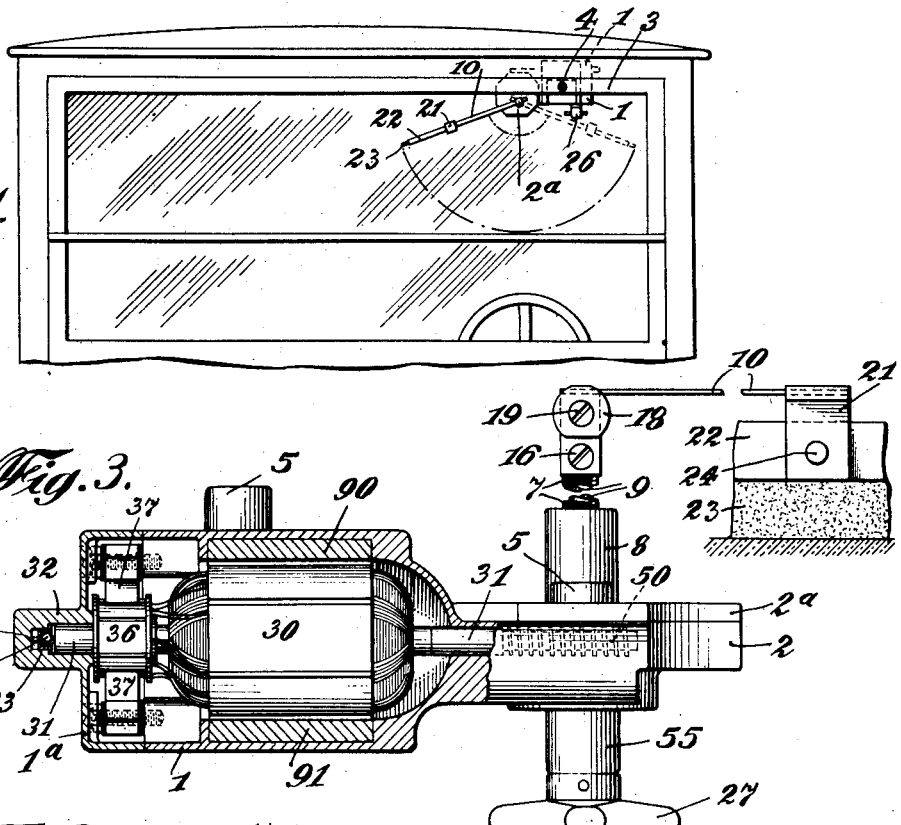
INVENTOR
Duncan A. McConnell
BY
George C. Bleau
his ATTORNEY

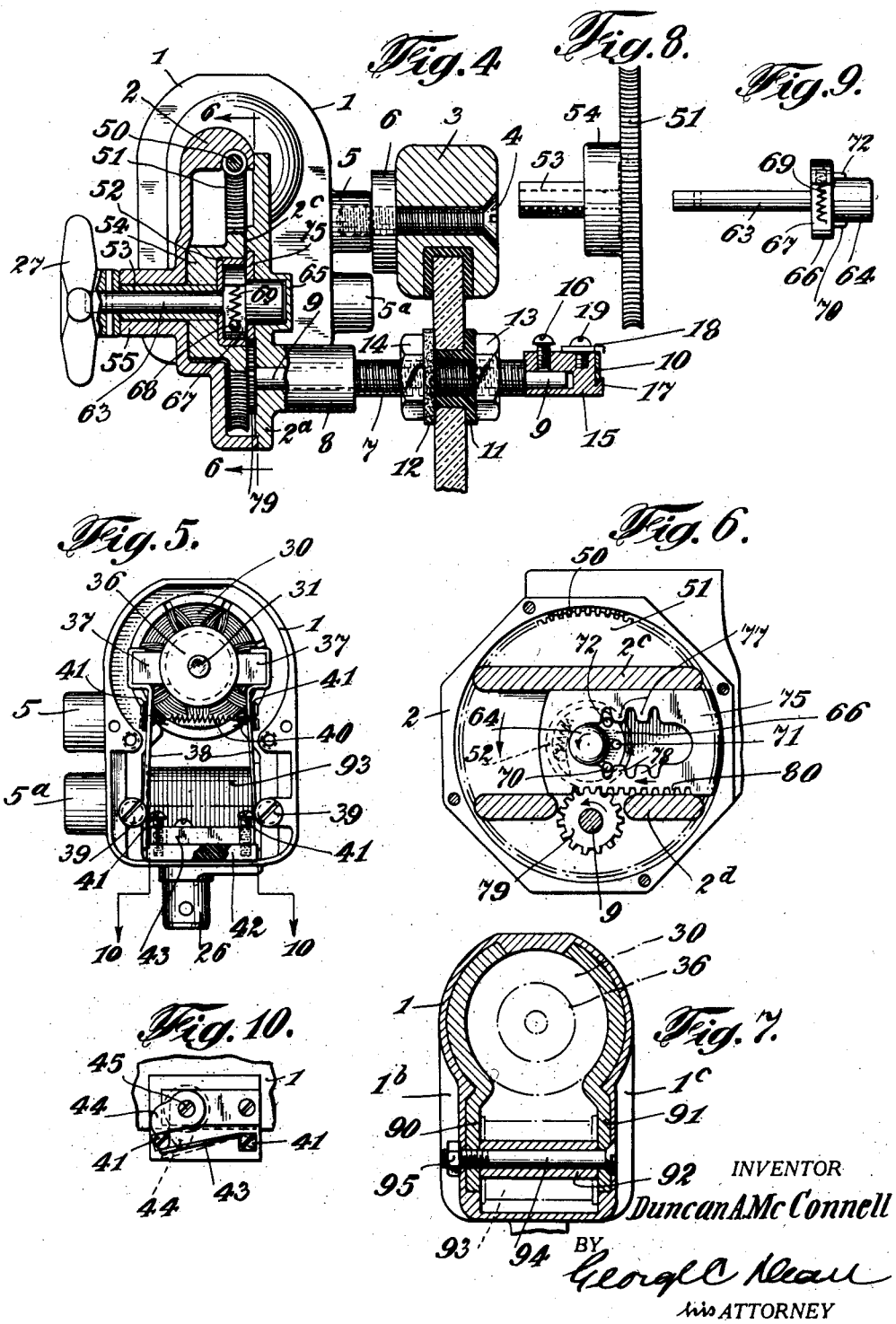

Patented Aug. 20, 1929.

1,725,405

UNITED STATES PATENT OFFICE.

DUNCAN A. McCONNELL, OF MONTCLAIR, NEW JERSEY.

WINDSHIELD WIPER AND THE LIKE.

Application filed March 26, 1924, Serial No. 701,905. Renewed January 15, 1929.

My present invention is shown as embodied in a motor driven device particularly adapted for use as a windshield wiper on automobiles, and in which the wiper is of the pivotal oscillatory type; but certain features of the invention may be embodied in other specific forms for other specific purposes.

One object of the invention is to embody in a compact unit, the usual rotary motor and reducing gear, combined with special means for transforming the rotary motion of the latter into reciprocating motion and utilizing the reciprocating motion to oscillate the rock shaft carrying the wiper; and the invention includes novel combinations of elements peculiarly adapted for the purposes in view. The motion transforming means is one that operates to drive the rock shaft of the wiper with approximately constant power and with substantially uniform speed from the beginning to near the very end of each sweep of the oscillatory wiper, and there is little or no dwell at the end of the sweep where the direction of movement reverses.

Another object of the invention is to provide means for hand operation of the wiper when the motor is not running, one special feature being interposition of a releasing means between the reducing gear and the motion transforming elements, whereby the hand operation is by continued rotary motion in one direction, preferably in the same direction as that of the reducing gear; and another feature of which is the employment of an over-running clutch which automatically clutches when the motor runs and unclutches to permit over-running, hand-operation when the motor is stationary and thereby locks the reducing gear.

The above and other features of my invention will be more evident from the following description in connection with the accompanying drawings, in which Fig. 1 is a front elevation showing my device in use on an exposed glass surface such as the windshield of an automobile;

Fig. 2 shows the device, as viewed from the rear in Fig. 1, parts of the casing being broken away to vertical section to show the motor brushes at one end and the worm reducing gear at the other end of the motor armature shaft;

Fig. 3 is a horizontal section on line 3, 3, Fig. 2;

Fig. 4 is a vertical section on the line 4, 4, Fig. 2;

Fig. 5 is an elevation looking from the left of Fig. 2 and with the motor casing cover removed;

Fig. 6 is a section on the line 6, 6, Fig. 4;

Fig. 7 is a section on the line 7, 7, Fig. 2;

Fig. 8 is a detail side view of the worm gear and shaft unit;

Fig. 9 is a detail view of the pin gear and shaft unit;

Fig. 10 is a detail view of a switch whereby the motor may be stopped or started.

In these drawings, the device is shown as comprising a motor case 1 integral with a gear case 2. The motor case has a removable cover section 1ª and the gear case a removable cover section 2ª. The device is secured to the frame 3 of the automobile windshield by bolt 4 passing through the frame and engaging a screw boss 5 on the side of the motor casing. The bolt may be provided with lock nut 6, or the latter may be a lock washer against which boss 5 is drawn by tightening screw bolt 4. There is another screw boss 5ª, below 5, which can be used when there is space enough between frame 3 and the roof of the car, to permit securing the device higher up.

In either case, the device is further anchored against rotating about the axis of bolt 4 by means of the externally screw threaded bearing sleeve 7 projecting from screw boss 8 and affording bearing for the rock shaft 9 which carries the wiper radius arm 10. Preferably there is a fiber, rubber or other non-metallic bushing 11 and washer 12 clamped by nuts 13, 14, on screw sleeve 7, preventing direct contact of metal with the glass and also utilizing the strength of the glass to prevent rocking of the device about the boss 5 as a fulcrum.

The radius arm 10 is preferably of spring metal and is secured to the rock shaft 9 by any suitable means. As shown, there is a clamping block 15, secured by set screw 16 and having on the end thereof one undercut clamping lug 17 engaging one edge of the radius arm 10. The other edge of the radius arm is engaged by clamp member 18 secured by screw 19. The free end of radius arm 10 carries bifurcated clamp 21 engaging the U-shaped metal back 22 in which is pinched the wiping rubber strip 23. A simple means for locking the clamp to the wiper holder is a split pin 24 having bent over ends 25 to prevent withdrawal. The engagement is a loose one to permit a certain amount of pivotal play whereby the wiper 23 may accommodate itself to the surface of the glass against which it is yieldingly pressed by the spring tension of the radius element 10.

There is a rotary switch operating hand piece 26 projecting downward from the lower edge of motor casing 1 and a rotary wiper operating hand piece 27 projecting from the rear face of gear casing 2.

The power driving instrumentalities are as follows:

In the motor case 1 is the armature 30 carried by shaft 31, rotatably mounted in bearing boss 32 of cover 1ª, and containing an anti-friction thrust bearing consisting of a steel cup 33, resting on lugs 34 and containing a ball 35. The other end of the shaft 31 is journalled in and projects into gear casing 2. The armature has a commutator 36 on which bear brushes 37, 37, carried by arms 38, 38, pivoted on studs 39, 39 and spring pressed towards each other by tension spring 40, anchored in insulating bushings 41, 41.

The power available through motor armature shaft 31 is utilized through worm 50 to produce relatively slow but powerful rotation of worm gear 51. This gear is preferably cast integral with a steel cup 52 and a steel bearing sleeve 53, held together by a strengthening hub 54 by methods well understood in the art of die casting. The sleeve 53 forms the shaft support for the gear and has a long bearing in bearing boss 55 of gear casing 2 and the rear face of the hub 54 bears against the inside of the case and acts as a spacing element to maintain the worm gear 51 in the plane of the worm 50. Thus, parts 51, 52, 53 and 54 form an integral unit which is separately removable as indicated in Fig. 8.

This unit is the driving rotor which with high speed armature and worm constitute the low speed driving instrumentalities from which may be driven the primary driven shaft 63 of the driven instrumentalities for rocking the wiper shaft.

The said driven instrumentalities are the same whether power driven or hand driven. The hand driven instrumentalities are as follows:

Rotatably mounted in the sleeve shaft 53, is a second removable unit, the detail of which is shown in Fig. 9. This consists of the hand operated shaft 63 which has the hand wheel 27 permanently locked on the rear end thereof. This driven shaft is the primary driven rotor. It has an enlarged extension 64 which fits a boss 65 in the gear case cover 2ª and which also serves as a centering element and means for facilitating assembly of parts hereinafter described. The shaft 63 has formed thereon, at the base of the enlarged portion 64, a disc 66.

As indicated in Fig. 9 and as shown more clearly in Fig. 6, the disc 66 carried pins 70, 71, 72, which are parallel to the axis of shaft 63 and constitute in effect three teeth of a segmental or "mutilated" pin-gear. When disk 66 is rotated, either manually or by power, this segmental gear operates to change continuous one-direction rotary motion of shaft 66 into reciprocating motion through the medium of a slide member 75 (see Fig. 6). This slide is held to straight line reciprocation by guides 2ᶜ, 2ᵈ, which are integral with gear cover 2ª. The slide has a slot into which projects the enlargement 64 of the gear shaft 63 and also the gear pins 70, 71, 72, the latter meshing alternately with rack teeth 77 on the upper side of the slot and then with teeth 78 on the lower side of the slot. From Fig. 6 it will be evident that in the position shown and with the parts rotating in the direction of the arrows, the slide 75 is at the right hand end of its stroke where pin 70 is just completing its engagement with the last tooth of the lower rack. In this position the pin 72 is about to come into engagement with the upper rack at an angle affording a powerful camming component as well as a nearly maximum speed translation component. This camming component, together with the added momentum of the armature due to a revolution or two, under practically no load, is particularly useful in overcoming the inertia and friction resistance at the points where the direction of movement of the slide and also of the wiper reverses. The instant the pin 72 is fairly in engagement with the upper rack, the movement of the slide 75 toward the left becomes substantially normal full speed and so continues until the very end of the stroke when there will be a slight decrease of the speed attendant upon a forward camming action, while the last pin is leaving the last rack tooth. It will be obvious that the above relatively uniform ratio of leverage and power translation, with its extremely small arc for motor acceleration at the end of each stroke, permits designing the gears for a greater maximum load or for a greater speed of movement than is possible where the slide is reciprocated by a crank. With a crank drive, about one-sixth of each gear revolution near both ends of the stroke is characterized by undesirably low-speed, high power leverage ratios while the mid-strokes are characterized by undesirable high-speed, heavy-load and low-power leverage ratios; and the motor and crank must be designed for carrying the mid-stroke load.

As shown in Fig. 6, the pin-gear comprises only three teeth and these teeth engage very deeply with the rack. The deep engagement increases the amount of camming action available at the beginning and end of each stroke when the direction of movement of the wiper reverses, but it will be evident that the number of teeth may be increased and the depth of their engagement reduced to almost any desired extent. The finer and shallower the teeth, the more nearly will the to and fro speed of the slide 75, conform to the periphery speed of the driving gear and the shorter will be the dwell between disengagement of the last tooth of the gear with the last tooth of one rack and the engagement of the first tooth of the gear with the first tooth of the opposite rack.

The above described hand driven instrumentalities for rocking the wiper shaft become also the power driven instrumentalities for rocking said shaft as follows:

The disc 66 on shaft 63 has a peripheral recess presenting an outward wedge surface 67 and a wedge ball 68. A spring 69 presses the ball into contact with the convergence between wedge surface 67 and the cooperating inner wall of the steel cup 52, which is the output rotor of the power driving unit.

These elements, as fully explained above, constitute a coupling in which the parts are always engaged, but which cannot wedge or lock except as against stress in one direction and hence are always free as against stress in the other direction. When the hand shaft 63 is rotated clockwise, Figs. 2 and 6, the wedge ball 67 slips or rolls idly in contact with 67 and 52, permitting free hand rotation in said direction. But the parts are always wedged as against any relative movement in the opposite direction, because the spring 69 keeps the ball 68 pushed into the convergence of surfaces 57 and 62. Hence the parts are always wedged as against forward rotation of the drive rotor 52, with respect to shaft 66 and as against reverse hand rotation of shaft 66 with respect to the power rotor 52. Hence, though the motor may prevent reverse hand rotation and attempts at reverse hand rotation may stall the motor nevertheless, there is no means whatever for preventing forward hand rotation at any and all times. On the other hand, there is no means for disengaging the ball from its position in contact with both the wedge surfaces 57 and 62, and hence no means for releasing or preventing locking of parts in the opposite direction.

As before noted, the lateral guides 2ᶜ, 2ᵈ, engaging the edges of slide 75 are located on the cover 2ᵃ and the wiper rock shaft 9 with its pinion 79 is also carried by the cover. The axis of the latter is eccentrically located on the cover so as to permit engagement with the rack 80 on the lower edge of slide 75. With this organization of parts, it will be noted that the cover may be secured in any desired angular position, the line of reciprocation of the slide 75 being controlled solely by said guides 2ᶜ, 2ᵈ, carried by the cover. This is desirable because it permits of shifting the rock shaft 9 from the position shown in Fig. 6, where it is directly below the pin-gear and worm-gear and securing it in any other desired position. For instance, a shift of 90° to the left will bring the rock shaft into more favorable position for operation in case it is desired to secure the device with its armature shaft in the vertical position.

While the sweep of the wiper is preferably symmetrical with respect to a line perpendicular to the armature shaft, as shown in Fig. 1, it will be evident that the casing can be secured at any desired angle and the sweep of the wiper adjusted to any desired arc with respect thereto by selecting a proper portion of the periphery of pinion 79 for engagement with a desired part of the rack 80.

The magnetic pole pieces and coil for the motor field may be secured within the casing in any desired way. As shown in the drawings, the two pole pieces 90, 91, are connected by magnetic yoke piece 92, which is the core of magnetizing coil 93 and the latter is held in position by a through-bolt 94 secured by nut 95. Preferably the exterior of the casing at this point is formed with recesses 1ᵇ, 1ᶜ, of which 1ᶜ, being flat bottomed and unobstructed, may be used to contain and protect a desired name plate or label.

The switch for starting and stopping the motor includes screw posts 41, 41, each adjacent one of the screw studs 39 and adapted to be electrically connected therewith. The screws 41 are insulated from each other by mounting them on an insulated block 42, secured to the inner face of casing 1. As shown in Fig. 10, one of the screws 41 has rigidly secured thereon a spring arm 43, extending across to and normally spring pressed against the other screw post 41. The contact is broken by rotating a cam projection 44 to the dotted line position where it is held by the pressure of spring 43, which is then under tension and out of contact with the adjacent post 41. The cam 44 is secured by screw 45 in the axis of an upward extension from the rotary switch operating handpiece 26 above referred to.

The switch terminals are connected with any suitable source of power as, for instance, the storage batteries of the automobile, so that the power driving instrumentalities may be started or stopped whenever desired.

While I have herein shown and described a preferred embodiment of my invention, I do not wish to be understood as limiting myself to the precise details of construction herein before described and illustrated, since changes may be made in the form, proportion, and construction of the several parts without departing from the principle of my invention as defined in the appended claims.

I claim:

1. A wiper of the class described, including a rock shaft carrying a radius arm and wiper element in operative relation to the surface to be wiped, a radial element carried by said rock shaft, a reciprocating slide engaging said radial element to rock said shaft, a rotary electric motor, motion transforming means operatively connected to said motor for reciprocating said slide, and hand operated means whereby said motion transforming means may be operated and said slide reciprocated independently of the motor.

2. A wiper of the class described, including a rock shaft carrying a radius arm and wiper element mounted in operative relation to the surface to be wiped, and also carrying a radial element, and a reciprocating slide engaging said radial element to rock said shaft, in combination with a rotary electric motor, motion transforming means interposed between said motor and slide for reciprocating said slide, including a reducing gear and an over running clutch, and hand rotated means associated with the driven member of said over running clutch, whereby the latter may be rotated and said slide reciprocated by hand independently of said reducing gear when said motor is not running.

3. A device of the class described, including a rock shaft and wiper; one-way, slow-speed, rotary driving instrumentalities including a rotary electric motor having a worm on the armature shaft thereof and a worm gear in operative relation to said worm; and driven instrumentalities including a driven rotor and mechanism for transforming the rotary motion of said rotor and applying it as rocking motion of said rock shaft, in combination with a one-way coupling between said driving and driven instrumentalities whereby the worm gear is coupled to the rotor of the motion transforming mechanism in the direction for applying its power drive effort, but said rotor is at all times free for hand rotation in the same direction.

4. In a device of the class described, a rock shaft and wiper and means for operating the same, comprising one-way, slow-speed rotary driving instrumentalities including a rotary electric motor having an armature shaft carrying a worm, a gear case having a removable cover, a worm wheel mounted within the gear case and having an extended hollow shaft mounted in the rear face of the gear case and endwise removable therefrom, said worm projecting into said gear case and engaging said worm wheel; and driven instrumentalities including an inner shaft mounted in and having one end accessible through the rear end of said hollow shaft for independent operation from the exterior, motion-transforming means actuated upon rotation of said inner shaft and actuating said rock shaft, and means whereby said inner shaft may be driven by said worm gear or by said independent means.

5. In a device of the class described, a rock shaft and wiper and means for operating the same, comprising one-way, slow-speed rotary driving instrumentalities including a rotary electric motor having an armature shaft carrying a worm, a gear case having a removable cover section, a worm wheel rotatably mounted within said gear case, said worm projecting into said gear case and engaging the worm wheel and driven instrumentalities including an inner shaft concentric with and extending through said worm wheel and having one end accessible through the rear wall of said gear case for independent operation from the exterior; motion-transforming means actuated by rotation of said inner shaft and actuating said rock shaft, means whereby said inner shaft may be driven by said worm gear or by said independent means, said motion-transforming means including a segmental or mutilated gear carried by said inner shaft and a slide guided by the face of the worm gear and by the cover of the gear case, and formed with internal opposite racks alternately engaged by said mutilated gear to reciprocate the slide.

6. In a device of the class described, a rock shaft and wiper and means for operating the same, comprising one-way, slow-speed rotary driving instrumentalities including a rotary electric motor having an armature shaft carrying a worm, a gear case having a removable cover, a worm wheel rotatably mounted within said case, said worm projecting into said gear case and engaging the worm wheel, and driven instrumentalities including an inner shaft concentric with said worm gear and having one end accessible through the rear wall of said gear case for independent operation from the exterior, motion-transforming means actuated by rotation of said inner shaft and actuating said rock shaft, means whereby said inner shaft may be driven by said worm gear or by said independent means, said motion-transforming means including a segmental or mutilated gear carried by said inner shaft and a slide formed with internal opposite racks alternately engaged by said mutilated gear to reciprocate the slide, and all of said parts except the rock shaft being in the main gear case, the cover section of the gear case carrying edge guides and a face guide for confining the slide in contact with the face of the worm gear and a bearing for the wiper rock shaft, whereby the latter is supported in operative relation to the slide to be rocked thereby.

7. In a device of the class described, a rock shaft and wiper and means for operating the same, comprising one-way, slow-speed rotary driving instrumentalities including a rotary electric motor having an armature shaft carrying a worm, a flat gear case having a removable cover, a worm wheel having a rearwardly extended hollow shaft mounted in the rear face of the gear case and endwise removable therefrom, said worm projecting into the gear case and engaging the worm wheel, driven instrumentalities including an inner shaft mounted in and having one end accessible through the rear end of said hollow shaft for independent operation from the exterior, motion-transforming means actuated by rotation of said inner shaft and actuating said rock shaft, means whereby said inner shaft may be driven by said worm gear or by said independent means, said motion-transforming means including a segmental or mutilated gear carried by said inner shaft and a slide formed with internal opposite racks alternately engaged by said mutilated gear to reciprocate the slide, all of said parts except the rock shaft being in the main gear case, the cover section of the gear case carrying edge guides and a face guide for confining the slide in contact with the face of the worm gear and a bearing for the wiper rock shaft, whereby the latter is supported in operative relation to the slide to be rocked thereby, said bearing being eccentrically located on the cover section of the gear case, said cover section being adapted to fit and fasten to the main section in a plurality of angular relations to present the rock shaft adjacent different portions of the periphery of the gear case.

8. A device of the class described, comprising a gear case having a removable cover, a rotary electric motor having an armature shaft projecting thereinto, a rock shaft and wiper located in an eccentric bearing eccentrically positioned on the cover, the cover being adapted to fit and fasten to the case in a plurality of angular positions to present the rock shaft adjacent different portions of the periphery of the gear case, and motion-transforming mechanism within the case operatively connecting the armature shaft with the rock shaft to rock the latter regardless of the position in which the cover is secured to the case.

9. A windshield wiper, comprising a unitary motor case and gear case, a rotary electric motor in the motor case the armature shaft of which carries a worm projecting into the gear case, said motor case having a removable end section through which the armature and worm may be withdrawn, a worm gear within the gear case having a hub portion the rear face of which bears against the face of the casing and carries a hollow shaft rotatably mounted in the casing, the other face of the gear being formed as a slide surface with a recess at the center thereof; an inner shaft journalled in said hollow shaft, having a head in said recess in the front face of the worm gear and an engaging surface, a clutch ball positioned in locking relation to said engaging surface and the wall of said recess, and segmental gear elements extending beyond the front face of said head; a slide plate engaging said slide surface of said worm gear and formed with a slot having internal oppositely directed rack teeth adapted to be driven alternately by said segmental gear elements and formed also with lateral guide surfaces and with a driving rack, said gear case being formed with a removable cover section having guides adapted to engage the lateral guide surfaces of said slide and having journalled therein a rock shaft carrying a wiper and a pinion, said pinion engaging said drive rack to be oscillated thereby.

10. A windshield wiper, comprising a unitary motor case and gear case, a rotary electric motor in the motor case the armature shaft of which carries a worm projecting into the gear case, said motor case having a removable end section through which the armature and worm may be withdrawn, a worm gear within the gear case having a hub portion the rear face of which bears against the face of the casing and carries a hollow shaft which is rotatably mounted in a boss on the casing, the other face of the gear being formed as a slide surface with a recess at the center thereof; an inner shaft journalled in said hollow shaft, having a head in said recess in the front face of the worm gear and formed with an engaging surface, a clutch ball positioned in locking relation to said engaging surface and the wall of said recess, and segmental gear elements extending beyond the front face of said head; a slide plate engaging said slide surface of said worm gear and formed with a slot having internal oppositely directed rack teeth adapted to be driven alternately by said segmental gear elements and formed also with lateral guide surfaces and with a driving rack, said gear case being formed with a removable cover section having guides adapted to engage the lateral guide surfaces of said slide and having journalled therein a rock shaft carrying a wiper and a pinion, said pinion engaging said drive rack to be oscillated thereby, said worm gear with hollow shaft being one unit and said inner shaft with head and gear elements being a second unit, endwise removable from the casing and from each other when the cover is removed.

11. A windshield wiper, comprising a unitary motor case and gear case, a rotary electric motor in the motor case the armature shaft of which carries a worm projecting into the gear case, said motor case having a removable end section through which the armature and worm may be withdrawn, a worm gear within the gear case having a hub portion the rear face of which bears against the face of the casing and carries a hollow shaft which is rotatably mounted in the casing, the other face of the gear being formed as a slide surface with a recess at the center thereof; an inner shaft journalled in said hollow shaft, having a head in said recess in the front face of the worm gear and an engaging surface, a clutch ball positioned in locking relation to said engaging surface and the wall of said recess, and segmental gear elements extending beyond the front face of said head; a slide plate engaging said slide surface of said worm gear and formed with a slot having internal oppositely directed rack teeth adapted to be driven alternately by said segmental gear elements and formed also with lateral guide surfaces and with a driving rack, said gear case being formed with a removable cover section having guides adapted to engage the lateral guide surfaces of said slide and having journalled therein a rock shaft carrying a wiper and a pinion, said pinion engaging said drive rack to be oscillated thereby, said worm gear with hollow shaft being one unit and said inner shaft with head and gear elements being a second unit, endwise removable from the casing and from each other when the cover is removed and said rock shaft with its pinion being a third unit which is similarly endwise removable from within the cover.

12. In a windshield wiper, a wiper element, a wiper shaft, hand driven instrumentalities operatively connected with said wiper shaft for transforming one-way rotary motion into reciprocatory rotary movement of said shaft; and motor driving instrumentalities including a rotary motor having a one-way rotating drive element associated with said hand driven instrumentalities for driving the latter by power as well as by hand.

13. In a windshield wiper, a wiper element, a wiper shaft, driven instrumentalities operatively connected with said wiper shaft including a primary driven rotor adapted to be rotated by hand, motion-transforming mechanism associated therewith for effecting reciprocatory rotary movement of said wiper shaft; and motor drive instrumentalities for said driven rotor including means for producing one-way, slow-speed rotation of a suitable driving rotor, and a clutch device between said driving rotor and said driven rotor whereby said driven rotor may be rotated by hand or by motor, at will.

14. A device of the class described, including a gear case having a removable cover, a rotary electric motor carried thereby and having an armature shaft, a worm mounted on said shaft within the gear case, a worm gear journalled in said case meshing with said worm, a segmental or mutilated gear coaxial with and driven by said worm gear, a slide formed with internal opposite racks alternately engaged by said mutilated gear to reciprocate the slide, edge guides and face guides on the cover section of the gear case for confining the slide in contact with the face of the worm gear, a rack formed along one edge of said slide, a rock-shaft carrying a pinion which meshes with said edge rack of the slide, said rock-shaft being journalled in and having one end projecting through a wall of the gear case and carrying a wiper arm carrying a wiper adapted to engage the surface to be wiped.

Signed at Newark, in the county of Essex and State of New Jersey this 24th day of March, A. D. 1924.

DUNCAN A. McCONNELL.